United States Patent [19]

Long

[11] Patent Number: 4,938,867
[45] Date of Patent: Jul. 3, 1990

[54] CONFIGURATION OF AERATION CHAMBER FOR AN ACTIVATED-SLUDGE SEWAGE TREATMENT SYSTEM

[76] Inventor: Sam Long, 3046 N. 40th St., Kansas City, Kans. 66104

[21] Appl. No.: 239,943

[22] Filed: Sep. 2, 1988

[51] Int. Cl.⁵ ............................................. B01D 35/00
[52] U.S. Cl. ................................... 210/220; 210/920; 261/122; 261/DIG. 47
[58] Field of Search ................ 210/219, 220, 150, 151, 210/926, 195.3, 534, 536, 920, 523, 525, 528; 261/122, DIG. 47, 77

[56] References Cited

U.S. PATENT DOCUMENTS

| | | | |
|---|---|---|---|
| 1,681,890 | 8/1928 | Washburn | 210/220 |
| 1,700,722 | 1/1929 | Imhoff | 210/624 |
| 1,849,146 | 3/1932 | Kraut | 261/DIG. 47 |
| 2,138,349 | 11/1938 | Mallory | 210/220 |
| 2,212,841 | 8/1940 | Maxwell | 261/122 |
| 2,521,474 | 9/1950 | Morgan | 210/220 |
| 3,220,706 | 11/1965 | Valdespino | 261/77 |
| 3,599,794 | 8/1971 | Schreiber | 210/195.3 |
| 3,642,615 | 2/1972 | Wieferig | 210/151 |
| 3,807,565 | 4/1974 | Langston et al. | 210/220 |
| 3,923,657 | 12/1975 | Roser | 210/220 |
| 3,936,381 | 2/1976 | Pacaud | 210/220 |
| 3,966,604 | 6/1976 | Diggs | 210/220 |
| 4,443,338 | 4/1984 | Reid | 210/926 |
| 4,576,719 | 3/1986 | Hurley et al. | 210/620 |
| 4,670,142 | 6/1987 | Lowry | 210/526 |
| 4,696,740 | 9/1987 | Mochizuki et al. | 210/151 |
| 4,832,847 | 5/1989 | Fujii et al. | 210/150 |

Primary Examiner—W. Gary Jones
Assistant Examiner—Cynthia L. Nessler
Attorney, Agent, or Firm—D. A. N. Chase; Joan Optican Herman

[57] ABSTRACT

A configuration of an aeration chamber for an activated-sludge treatment plant includes an elongated, hydraulic plug-flow aeration chamber with a floor having a sloped portion and a level portion. The level portion, which acts as a collection area for the activated sludge, is adjacent the air diffusers of the aeration chamber at the point of maximum turbulence within the chamber. By using the force of gravity to assist in returning the activated sludge to the point of maximum turbulence, the aeration chamber of the present invention is able to process sewage in a more efficient manner.

5 Claims, 2 Drawing Sheets

CONFIGURATION OF AERATION CHAMBER FOR AN ACTIVATED-SLUDGE SEWAGE TREATMENT SYSTEM

BACKGROUND OF THE INVENTION

This invention relates to improvements in activated-sludge sewage treatment systems. This invention more specifically relates to activated-sludge sewage treatment systems in which all or part of the aeration basin is a long, narrow chamber, designed to promote plug flow of the mixed raw sewage and recycle sludge from the inlet end of the chamber to the outlet end. Such plug flow permits the introduction of more air per unit volume at the inlet end in order to give a large reduction of biological oxygen demand (B.O.D.) per unit volume of aeration chamber, and less air per unit volume near the outlet in order to save the cost of pumping air which would not be utilized because there is not enough food left in the mixed liquor to utilize the large amount of oxygen available.

Sewage treatment processes remove undesirable or offensive waste from water. Primary sewage treatment removes solids from the water by using screens, grit chambers, skimming tanks, and settling basins. Secondary sewage treatment generally is preceded by primary treatment. It is a process whereby a biological treatment system rapidly breaks down organic material. If the effluent of the secondary sewage treatment is not sufficiently clean to meet the mandated standard, secondary treatment may be followed by tertiary treatment.

The activated-sludge sewage treatment system is a commonly used form of secondary treatment. It uses biologically active growths as a means to process raw sewage into relatively clean water. This microbiological culture is mixed with raw sewage (or the effluent of a primary clarifier) in a basin or chamber. Aeration means provide air to promote consumption of the colloidal and soluble organic matter (i.e. biologically degradable waste) in the sewage by the culture. When the microbes feed upon the organic matter in the sewage, they generate an additional mass of microorganisms (referred to as "activated sludge"), along with carbon dioxide, water, nitrogen compounds, and traces of other compounds. When substantially all of the colloidal and soluble organic matter has been converted into insoluble microbes and innocuous by-products, the mixture is directed to a clarifier or secondary settling tank, which separates the relatively clean water, or finally treated effluent, from the microbes, and allows the clean water to be decanted. The finally treated effluent is then released into a river or intermittent stream. A substantial portion of the activated sludge is recycled to the aeration basin, while some of the sludge is continuously withdrawn to avoid excess accumulation of the recycle sludge.

For this system to produce a good quality of treated effluent, the decantation step must remove more than 99% of the solids from the feed mixture. Occasionally the microbiological growth produces a filamentous mycelium, which settles very slowly, if at all. Filamentous mycelia in the effluent of the aeration chamber make it impossible to get a good quality of treated sewage from the decanter (clarifier). This filamentous growth is caused by various factors, but most often by too much or too little air. Penury dictates that if there is an imbalance of oxygen demand and oxygen supply, the error will almost always be a short oxygen supply. Once a filamentous growth starts, it is difficult to suppress. In a large aeration basin with an adequate air supply, it is possible to have localized areas of oxygen starvation which invite filamentous growth. The designing engineer must avoid this pitfall.

Traditionally, the aeration basin has been a narrow, long chamber designed to promote plug hydraulic flow. Typical dimensions are from 20 feet by 200 feet to 40 feet by 1,000 feet, with a water depth of 12 feet to 18 feet. For economy of land use and of construction cost, the longer chambers are usually built in three parallel sections with a common wall between sections. The plug hydraulic flow of the mixed liquor through the aeration basin insures the maximum reduction of pollutants in the clarified effluent, while maintaining a high rate of oxygen usage throughout most of the chamber volume. In fact, one of the problems with the plug-flow aeration basin is the tendency to grow filamentous mycelia in spots of localized oxygen starvation.

While longitudinal recirculation is discouraged in a plug-flow aeration basin, transverse mixing is promoted to transfer oxygen from the point of introduction to the body of the mixed liquor, and to prevent settling of the activated sludge. The soluble and colloidal pollutants are rather evenly distributed throughout the transverse section, and it is necessary to bring oxygen and microbes to all parts of the chamber in order to consume the pollutants. Currently in the United States, this is done by "spiral-roll aeration" as shown in FIG. 1. In this system, a series of air spargers or diffusers is located near the bottom of one long wall of the chamber. The rising air bubbles carry a stream of water up this wall. Gravity carries this water across the top of the pool, down the opposite wall, and across the floor of the chamber back to the air spargers. The turbulence of this process holds the activated sludge in suspension. Ideally a droplet of water follows a spiral course from the inlet of the aeration chamber to the outlet, sweeping the activated sludge with it and repeatedly absorbing oxygen as it passes the air spargers.

Past practice in the United States has been to supply air to an activated-sludge aeration basin at a fairly constant rate over the 24-hour period, even though the hourly rate of inflow of raw sewage tends to vary widely during this time, as shown in FIG. 2. Since the sewage usually has a higher concentration of B.O.D. at the time of the higher flow rate, the ratio of the highest hourly input of B.O.D. to the lowest hourly input of B.O.D. during the diurnal cycle may be six to one, or even eight to one, although the ratio of the high flow rate to the low flow rat in this period is perhaps only four to one.

Although, with the constant rate of air flow to the aeration basin, the activated sludge adsorbs some of the excess oxygen during periods of low B.O.D. input and releases it during periods of high B.O.D. input; this system of control of air flow results in pumping more air than is needed to promote biological growth, and/or produces a treated-sewage effluent with a B.O.D. content which varies widely over the diurnal cycle. Hopefully, the daily average B.O.D. content will meet the 20 ppm standard of the United States Environmental Protection Agency. In recent years, some United States and foreign municipalities have begun using computer control to adjust the air flow in response to the immediate B.O.D. input to the aeration basin, in order to reduce the cost of pumping air and/or to produce a treated-sewage effluent of consistently good quality. Unfortunately, when the air flow is reduced to match the low B.O.D. input in the early hours of the morning, there is insufficient transverse movement of the mixed liquor to hold the activated sludge in suspension, and sludge tends to accumulate on the floor of the basin across from the air spargers. This settled sludge contributes nothing to the pollution-abatement process and due to localized oxygen depletion, may initiate filamentous growth of mycelia.

OBJECTS OF THE INVENTION

It is, therefore, the primary object the present invention to provide a redesigned hydraulic plug-flow aeration chamber in which gravity will assist the turbulent flow of the mixed liquor in transporting the activated sludge back to the zone of maximum turbulence adjacent the air spargers or diffusers.

It is a further object of the present invention to maintain the activated sludge in a state of suspension during the hours when air flow is reduced because of a reduced inflow of B.O.D.

DESCRIPTION OF THE PREFERRED EMBODIMENT

Figure 2:
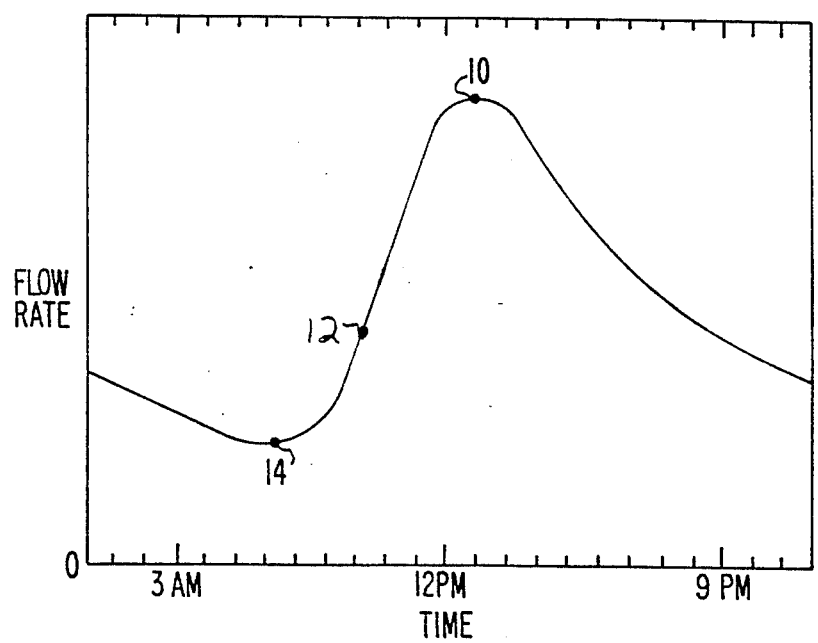
FIG. 2 is a graph showing the typical daily cycle of inflow to a municipal sewage treatment plant.

Referring to FIG. 2, the graph indicates the widely varying inflow rate to a typical municipal sewage treatment plant during a twenty-four hour period. It is seen from FIG. 2 that the maximum hourly flow rate 10 is twice the average hourly flow rate 12. Furthermore, the minimum hourly flow rate 14 is one-half the average hourly flow rate 12.

Figure 1:
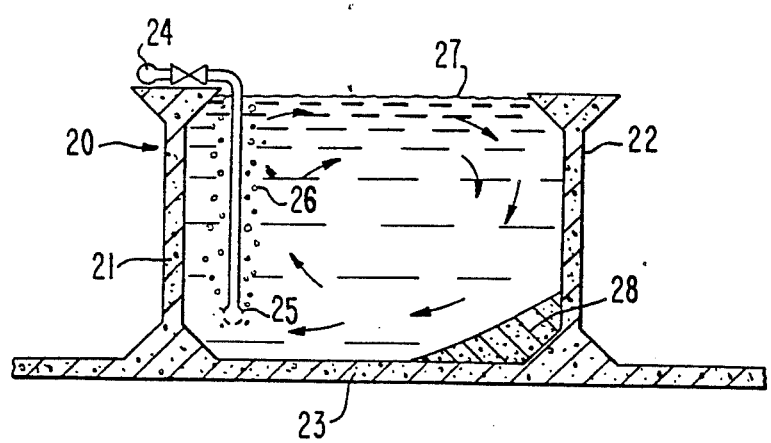
FIG. 1 is a diagrammatic, lateral cross-section of a plug-flow aeration chamber of the prior art showing spiral-roll aeration.

Referring to FIG. 1, a typical plug-flow aeration chamber of the prior art, generally referred to as 20, is depicted. The chamber is defined by elongated walls 21 and 22, and by a floor 23. Air supply 24 provides air to the chamber 20 through diffusers 25 located near the floor 23 and adjacent wall 21. As air is released from the diffusers 25, the air bubbles 26 formed rise and carry a stream of water up wall 21. Gravity works to carry this water across the top of the mixed liquor 27, down the wall 22, and across floor 23 of the chamber 20 back to the diffusers 25. This turbulence, known as spiral-roll aeration, holds the activated sludge in suspension, allowing the sludge to continually mix with and absorb the oxygen and the organic pollutants. The path of the liquid in spiral-roll aeration is depicted by the arrows in FIG. 1.

However, when air flow from the diffusers 25 is reduced in response to the lower B.O.D. levels during certain times of the day, the transverse movement of the mixed liquor is insufficient to hold the activated sludge in suspension. A portion of the sludge 28 therefore tends to accumulate on the floor 23 of the chamber 20 adjacent wall 22, creating undesirable inefficiency in the aeration process.

Figure 3:
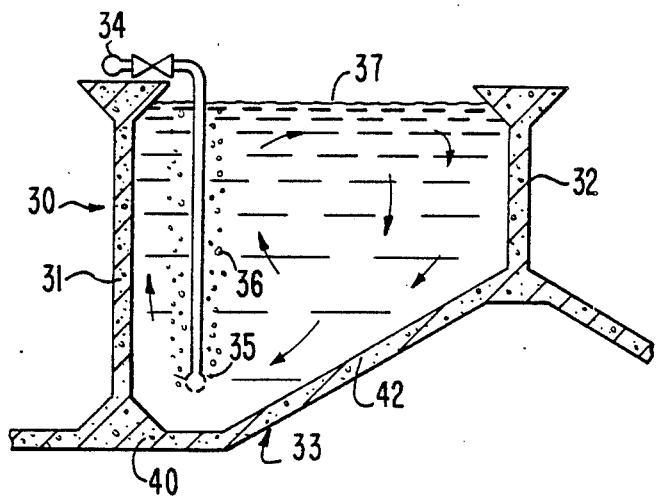
FIG. 3 is a diagrammatic, lateral cross-section of the plug-flow aeration chamber of the present invention.

Referring now to FIG. 3, a transverse section of a plug-flow aeration chamber of the present invention, generally referred to as 30, is shown. Aeration chamber 30 is similar to the aeration chamber 20 of the prior art, as it has a pair of elongated walls 31 and 32, and a floor 33. Air supply 34 provides air to the chamber 30 through the air diffusers 35 which are positioned adjacent wall 31. As air is released from the diffusers 35, the air bubbles 36 formed rise and carry a stream of water up wall 31, across the top of the mixed liquor 37, down wall 32 and sloped portion 42 of the floor 33, to the collection portion 40 of the floor 33, creating turbulence as noted by the arrows. Chamber 30 differs, however, in that collection portion 40 of the floor 33 is level, while portion 42 of floor 33 is sloped downwardly toward level portion 40. The collection portion 40 need not be level, as shown in this embodiment as long as it acts as a collection zone in the floor 33. The level portion 40 is preferably disposed near the diffusers 35. As noted above with spiral roll aeration sludge tends to accumulate as seen in FIG. 1. In the present embodiment, the flow pattern of the mixed liquor is also depicted by the arrows in FIGS. 3, 4 and 5. However, the sloped portion 42 of the floor 33 allows any accumulated or settleable sludge to travel by the force of gravity to the level portion 40 of the floor 33. By positioning the level portion 40 adjacent the diffusers 35, the sludge rs returned to the maximum turbulence zone, to thereby eliminate any appreciable accumulation of the sludge.

The slope of the floor 42 should be from 15° to 50° from the horizontal, and is preferably 25° to 35°. 50% to 90% of the floor 33 area should be sloped, with 75% to 85% being the preferred percentages. The air diffusers 35 should be located immediately above the level portion 40, as they create the most turbulent zone within the chamber 30, and it is desirable for the settleable sludge/to; travel down the sloped portion 42 to level collection portion 40 for maximum dispersion.

Figure 4:
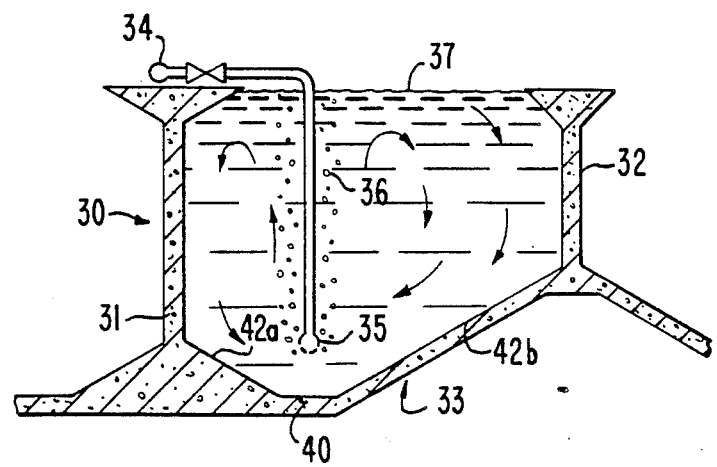
FIG. 4 is a diagrammatic, lateral cross-section of an alternative embodiment of the plug-flow aeration chamber of the present invention.
Figure 5:
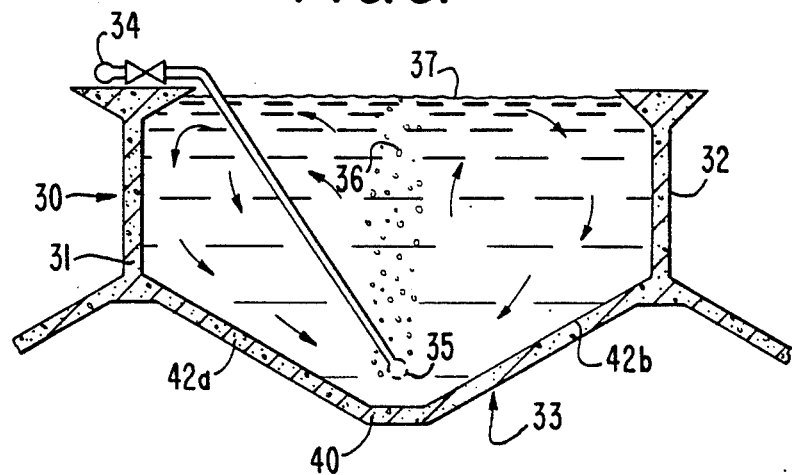
FIG. 5 is a diagrammatic, lateral cross-section of an additional alternative embodiment of the plug-flow aeration chamber of the present invention.

The position of the level portion 40 of the floor is variable. It may be adjacent to one wall of the chamber as shown in FIG. 3; it may be midway between the two walls of the chamber as shown rn FIG. 5; or it may be at an intermediate location as shown in FIG. 4 Like elements in FIGS. 4 and 5 bear the same reference numerals as in FIG. 3, and the above description of the functioning of the apparatus of FIG. 3 applies equally to FIGS. 4 and 5. The diffuser 35 is preferably positioned adjacent the level collection portion 40, creating varied turbulence patterns as shown by the arrows in FIGS. 4 and 5. In all of the embodiments, any sludge which settles along sloped portions 42, 42a, and 42b travels by gravity to level portion 40 where it encounters turbulence, and re-enters the spiral-roll aeration pattern.

It is to be understood that while certain forms of the invention have been illustrated and described, it is not limited thereto, except insofar as such limitations are included in the following claims.

Having thus described the invention, what is claimed as new and desired to be secured by Letters Patent is:

1. An activated-sludge sewage treatment plant comprising:
   an elongated, hydraulic plug-flow aeration chamber employing spiral roll aeration and provided with a floor and a pair of opposed walls extending upwardly from said floor at opposed longitudinal edges thereof, said floor having a sloped portion and an elongated bottom collection zone;

inlet means for introducing sewage influent into said aeration chamber for flow therethrough longitudinally thereof, aeration means for inducing spiral roll aeration by which air is introduced into said aeration chamber, including a series of diffuser means longitudinally spaced along said elongated chamber and located adjacent and above said collection zone of said floor for treating said sewage influent with aeration and mixing sufficient to provide an effluent having a biological oxygen demand lower than that of said sewage influent.

said sloped portion of the floor extending transversely upwardly at an angle to the horizontal of approximately 15 to 50 degrees to prevent the deposit of sludge from the sewage flowing through said chamber, and outlet means for discharging said effluent from said aeration chamber.

2. The activated-sludge sewage treatment plant as set forth in claim 1, wherein 50% to 90% of said floor is sloped downwardly toward said collection zone.

3. The activated-sludge sewage treatment plant as set forth in claim 1, wherein 75% to 85% of said floor is sloped downwardly toward said collection zone.

4. The activated-sludge sewage treatment plant as set forth in claim 1, where the slope of said sloped portion is approximately 15° to 50° from the horizontal.

5. The activated-sludge sewage treatment plant as set forth in claim 1, where the slope of said sloped portion is approximately 25° to 35° from the horizontal.

* * * * *